J. H. REESE & T. F. DUNLAVY.
STUFFING BOX.
APPLICATION FILED FEB. 23, 1910.
972,247.
Patented Oct. 11, 1910.
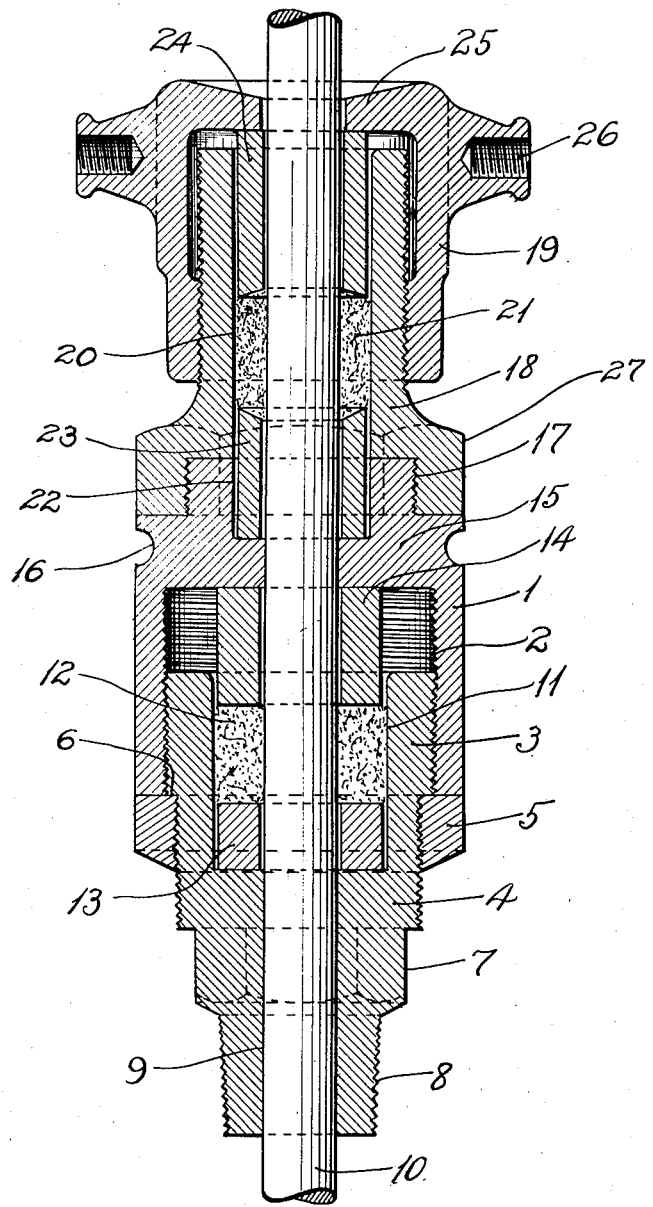
Witnesses.
Inventors.
John H. Reese and
Theron F. Dunlavy.
Attys.

UNITED STATES PATENT OFFICE.

JOHN H. REESE AND THERON F. DUNLAVY, OF COLEGROVE, CALIFORNIA, ASSIGNORS OF ONE-THIRD TO GEORGE G. HUNT, OF COLEGROVE, CALIFORNIA.

STUFFING-BOX.

972,247.  Specification of Letters Patent. Patented Oct. 11, 1910.

Application filed February 23, 1910. Serial No. 545,315.

*To all whom it may concern:*

Be it known that we, JOHN H. REESE and THERON F. DUNLAVY, citizens of the United States, residing at Colegrove, in the county of Los Angeles and State of California, have invented new and useful Improvements in Stuffing-Boxes, of which the following is a specification.

This invention relates to stuffing boxes and particularly to the stuffing boxes which are used at the mouths of deep wells such as gas wells or oil wells, although particularly useful in this connection, the stuffing box is useful wherever a reciprocating rod must be packed to prevent the escape of the gas or liquid under pressure.

With stuffing boxes as ordinarily constructed in connection with oil wells when it is necessary to repack the boxes a quantity of oil usually spurts upwardly when the box is opened causing inconvenience, annoyance and financial loss.

The object of this invention is to produce a stuffing box of special construction which can be repacked without permitting the escape of any oil at the side of the rod.

In the figure which fully illustrates our invention, 1 represents the main box, which is in the form of a socket open at its lower end and having internal threads 2 adapted to receive a plug 3 which screws into the lower end of the socket as shown. The lower portion of the plug 3 is formed with a threaded neck 4, and on this threaded neck there is received a jam nut 5 which seats against the lower end of the socket 1 and may be against the angular shoulder 6, which is formed between the reduced neck and the body thereof. Below the neck 4 an angular or hexagonal nut 7 is formed integral with this neck, and below this nut the lower end of the plug is formed into a threaded nipple 8, which is adapted to screw into the end of the pipe or casing.

The lower portion of the plug 3 is provided with a bore 9, through which the polished rod 10 or piston rod reciprocates. The upper portion of the plug 3 is formed with an enlarged bore 11 forming a pocket to receive the packing 12. In the lower part of the pocket 11 a bottom ring 13 is placed and upon the upper face of this bottom ring the packing 12 rests, as shown. On the upper side of the packing 12 a follower ring 14 seats and the upper end of this ring 14 rests against the upper head 15 of the socket 1. Opposite the head 15 the outer face of the socket 1 is provided with notches or recesses 16, which enable the socket to be held by means of a spanner wrench. The upper end of the socket is formed with a reduced threaded nipple 17 and this nipple screws into the lower end of a tubular neck 18, as shown. This neck 18 is threaded on its exterior so as to receive a cap nut 19 and the neck 18 is further provided with an enlarged bore 20 forming a packing space around the rod 10, which space is filled with a packing material 21, as indicated. The upper end of the socket 1 is formed with a counter bore 22 which is of the same diameter as the bore 20 so as to form an extension thereof and in this counter bore 22 a bottom ring 23 seats. On the upper side the packing 21 is pressed by a follower ring 24, the upper end of which receives a thrust from the head 25 of the cap nut 19. On opposite sides the cap nut 19 is formed with threaded sockets 26 in which threaded spikes may be secured to increase the leverage for tightening the nut. The lower end of the neck 18 is formed into a hexagonal nut 27, which facilitates screwing the neck on the threaded nipple 17. The packing 21 constitutes the main packing, and this packing is normally maintained tightly pressed against the side of the rod by means of the nut 19, and as the packing wears the nut can be tightened up so that the box can be kept tight at this point.

The packing 12 constitutes an auxiliary packing, which is normally loose in its pocket 11. When the packing 21 is to be renewed the jam nut 5 should be loosened and the plug 3 should then be screwed up more tightly into the pocket 1. This will compress the packing 12 and render the stuffing box tight at this point. The packing 21 can then be renewed without substantially any leaking occurring at the stuffing box. In this way the lower pocket 11 constitutes an auxiliary stuffing box which is normally inactive, but which is in operation when the upper box is to be repacked. On account of the fact that the lower packing 12 is normally not under compression it will require renewal of the packing only at great intervals of time.

Having described our invention what we claim as new and desire to secure by Letters Patent is:

A stuffing box having a main socket opening downwardly, a plug screwing into said socket and forming a pocket adapted to receive packing, a tubular neck screwing on the upper end of said socket and forming a pocket adapted to receive packing, and a cap nut screwing on said neck and adapted to compress the packing in said last named pocket.

In witness that we claim the foregoing we have hereunto subscribed our names this 15th day of February, 1910.

J. H. REESE.
THERON F. DUNLAVY.

Witnesses:
F. D. AMMEN,
EDMUND A. STRAUSE.